United States Patent
Cheng et al.

(10) Patent No.: US 10,817,167 B2
(45) Date of Patent: Oct. 27, 2020

(54) DEVICE, METHOD AND COMPUTER PROGRAM PRODUCT FOR CREATING VIEWABLE CONTENT ON AN INTERACTIVE DISPLAY USING GESTURE INPUTS INDICATING DESIRED EFFECTS

(71) Applicant: Microsoft Technology Licensing, LLC, Redmond, WA (US)

(72) Inventors: Shirui Cheng, Lund (SE); To Tran, Arlöv (SE)

(73) Assignee: Microsoft Technology Licensing, LLC, Redmond, WA (US)

(*) Notice: Subject to any disclaimer, the term of this patent is extended or adjusted under 35 U.S.C. 154(b) by 176 days.

(21) Appl. No.: 15/267,113

(22) Filed: Sep. 15, 2016

(65) Prior Publication Data
US 2018/0074688 A1    Mar. 15, 2018

(51) Int. Cl.
| | |
|---|---|
| *G06F 3/0488* | (2013.01) |
| *G06F 3/0484* | (2013.01) |
| *G06T 3/20* | (2006.01) |
| *H04N 5/225* | (2006.01) |
| *H04N 5/77* | (2006.01) |

(Continued)

(52) U.S. Cl.
CPC ........ *G06F 3/04883* (2013.01); *G06F 3/0484* (2013.01); *G06F 3/0488* (2013.01); *G06F 3/04845* (2013.01); *G06T 3/20* (2013.01); *G06F 2203/04806* (2013.01); *G06F 2203/04808* (2013.01); *G11B 27/034* (2013.01); *G11B 27/036* (2013.01); *G11B 27/34* (2013.01);

(Continued)

(58) Field of Classification Search
CPC .. G06F 3/0488; G06F 3/04883; G06F 3/0484; G06F 3/04845; G06F 2203/04806; G06F 2203/04808; G06T 3/20
USPC ........................................ 715/730, 731, 732
See application file for complete search history.

(56) References Cited

U.S. PATENT DOCUMENTS

| | | | |
|---|---|---|---|
| 7,017,115 B2* | 3/2006 | Hayashi .................. | G06T 11/60 345/649 |
| 7,051,291 B2* | 5/2006 | Sciammarella ....... | G06F 3/0481 715/838 |

(Continued)

OTHER PUBLICATIONS

Thorne et. al., Motion Doodles: An Interface for Sketching Character Motion (Aug. 2004), ACM Transactions on Graphics, vol. 23, No. 3, pp. 424-431. (Year: 2004).*

(Continued)

*Primary Examiner* — Kieu D Vu
*Assistant Examiner* — Rami R Okasha

(57) ABSTRACT

A device, method and computer program product for creating viewable content on an interactive display is provided. The method includes providing a user interface on a device for creating viewable content from a collection comprising at least one multimedia content. The method includes causing the user interface, by a processor, to present an interactive display to the user. The method includes presenting the collection on the interactive display. Further, the method includes receiving one or more gesture inputs by the user on the collection, wherein each gesture input indicates at least one of a desired effect to be performed and a region to be displayed on a viewport of the device. Furthermore, the method includes creating a viewable content from the at least one multimedia content of the collection based on the one or more gesture inputs.

20 Claims, 11 Drawing Sheets

(51) Int. Cl.
  *G11B 27/036* (2006.01)
  *G11B 27/34* (2006.01)
  *G11B 27/034* (2006.01)
  *H04N 9/804* (2006.01)

(52) U.S. Cl.
  CPC .......... *H04N 5/2257* (2013.01); *H04N 5/772* (2013.01); *H04N 9/8042* (2013.01)

(56) References Cited

U.S. PATENT DOCUMENTS

| | | | | |
|---|---|---|---|---|
| 7,065,710 | B2* | 6/2006 | Hayashi | G06F 3/0362 715/720 |
| 7,281,199 | B1* | 10/2007 | Nicol | G06F 17/211 715/203 |
| 7,941,758 | B2 | 5/2011 | Tremblay | |
| 8,122,356 | B2* | 2/2012 | Lawther | G06F 3/04817 715/716 |
| 8,146,018 | B2* | 3/2012 | Shimura | A63F 13/10 463/37 |
| 8,448,083 | B1* | 5/2013 | Migos | G06F 3/04883 345/671 |
| 8,621,357 | B2* | 12/2013 | Weber | G11B 27/034 715/731 |
| 8,875,049 | B1 | 10/2014 | Jitkoff et al. | |
| 9,122,372 | B2 | 9/2015 | Allen et al. | |
| 9,128,585 | B2* | 9/2015 | Weiner | G06F 3/04815 |
| 2004/0027370 | A1* | 2/2004 | Jaeger | G06F 3/0481 715/716 |
| 2010/0134499 | A1* | 6/2010 | Wang | G06T 13/80 345/473 |
| 2010/0185949 | A1* | 7/2010 | Jaeger | G06F 3/0481 715/730 |
| 2010/0218100 | A1* | 8/2010 | Simon | G06F 16/4393 715/731 |
| 2011/0029917 | A1* | 2/2011 | Um | G06F 3/04883 715/800 |
| 2011/0109581 | A1* | 5/2011 | Ozawa | G06F 3/0481 345/173 |
| 2011/0271236 | A1* | 11/2011 | Jain | G06F 3/0488 715/863 |
| 2012/0293427 | A1* | 11/2012 | Mukai | G06F 3/04883 345/173 |
| 2013/0208012 | A1 | 8/2013 | Ergan et al. | |
| 2014/0019865 | A1* | 1/2014 | Shah | G06F 3/0484 715/731 |
| 2014/0101605 | A1* | 4/2014 | Udvardy | G06F 3/0485 715/800 |
| 2014/0149922 | A1 | 5/2014 | Hauser et al. | |
| 2014/0189487 | A1 | 7/2014 | Kwan et al. | |
| 2014/0282013 | A1* | 9/2014 | Amijee | G06F 3/0482 715/732 |
| 2014/0340304 | A1 | 11/2014 | Dewan et al. | |
| 2014/0355961 | A1 | 12/2014 | Paulus et al. | |
| 2014/0372894 | A1* | 12/2014 | Pandy | G06F 3/0484 715/732 |
| 2015/0002433 | A1* | 1/2015 | Karlsson | G06F 3/0412 345/173 |
| 2015/0106722 | A1* | 4/2015 | Ubillos | G06F 3/0488 715/731 |
| 2015/0256763 | A1* | 9/2015 | Niemi | G06F 3/0485 348/700 |
| 2015/0277714 | A1* | 10/2015 | Wang | G06F 3/04845 715/767 |
| 2016/0027201 | A1* | 1/2016 | Saito | H04N 5/23216 345/475 |
| 2016/0048282 | A1 | 2/2016 | Bailiang | |

OTHER PUBLICATIONS

Zhaoa, et al., "A Model of Scrolling on Touch-Sensitive Displays", In International Journal of Human-Computer Studies, vol. 72, Issue 12, Dec. 2014, pp. 1-19.

"Using the Animation View", Published on: Mar. 5, 2015, 9 pages, Available at: https://docs.unity3d.com/Manual/animeditor-UsingAnimationEditor.html.

"Object Placement Style Editor", Published on: Feb. 8, 2016, 15 pages, Available at: https://knowledge.autodesk.com/support/3ds-max/learn-explore/caas/CloudHelp/cloudhelp/2016/ENU/3DSMax/files/GUID-8B278D6D-2267-4D69-9EF8-1E682A15A200-htm.html.

\* cited by examiner

DEVICE, METHOD AND COMPUTER PROGRAM PRODUCT FOR CREATING VIEWABLE CONTENT ON AN INTERACTIVE DISPLAY USING GESTURE INPUTS INDICATING DESIRED EFFECTS

TECHNICAL FIELD

The present application generally relates to multimedia content and processing and, for creating a viewable content using the multimedia content on an interactive display.

BACKGROUND

Social networking has revolutionized the way people connect with each other. For example, people frequently share images, clips, and videos associated with events of interest in their life, with friends or their other contacts. Initially, people used to share limited content such as a single image or a small video clip. However, faster networks and the availability of higher bandwidth have driven people to share multiple images and longer video clips in their social circle. Further, the availability of a variety of applications has enabled advanced users to create, edit and compose collages of images, video contents, and also the combinations of images and video contents. However, the task of creating a video collage with multiple images and video contents is an arduous task and is time consuming for novice users.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, a method for creating a viewable content on an interactive display is presented. The method includes providing a user interface on a device for creating viewable content from a collection comprising at least one multimedia content. The method includes causing the user interface, by a processor, to present an interactive display to the user. The method includes presenting the collection on the interactive display. Further, the method includes receiving one or more gesture inputs by the user on the collection, wherein each gesture input indicates at least one of a desired effect to be performed and a region to be displayed on a viewport of the device. Furthermore, the method includes creating a viewable content from the at least one multimedia content of the collection based on the one or more gesture inputs.

In an embodiment, a device for creating a viewable content on an interactive display is presented. The device includes a memory including computer program code for image processing and a processor. The processor is configured to execute the computer program code to cause the device to present an interactive display to a user on the user interface. The device is caused to present a collection comprising at least one multimedia content on the interactive display. The device is caused to receive one or more gesture inputs by the user on the collection, wherein each gesture input indicates at least one of a desired effect to be performed and a region to be displayed on a viewport of the device. Further, the device is caused to create a viewable content from the at least one multimedia content of the collection based on the one or more gesture inputs.

In an embodiment, a computer program product includes at least one computer-readable storage medium. The computer-readable storage medium includes a set of instructions, which, when executed by one or more processors, cause an device to provide a user interface on a device for creating viewable content from a collection comprising at least one multimedia content and to present an interactive display to a user on the user interface. The device is caused to present a collection comprising at least one multimedia content on the interactive display. The device is further caused to receive one or more gesture inputs by the user on the collection, wherein each gesture input indicates at least one of a desired effect to be performed and a region to be displayed on a viewport of the device. Further, the device is caused to create a viewable content from the at least one multimedia content of the collection based on the one or more gesture inputs.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Various example embodiments of the present disclosure provide creation of viewable content from multimedia contents in a device. These embodiments take input in form of multimedia contents such as image, video, and three dimensional object for creating the viewable content including any sequence/combination of the multimedia contents. Various embodiments provision for receiving a sequence of gesture inputs from the user onto the multimedia contents, and for creating the viewable content based on a sequence of gesture inputs provided by the user. Each gesture input of the user may correspond to a desired effect to be applied on a multimedia content (on which the gesture input is applied) at the time of playback of the viewable content. The user provides the gesture inputs on the multimedia content, and the viewable content (e.g., a video clip) is generated based on the received gesture inputs such that the viewable content can be played back in a sequence with the desired effect based on a sequence of the gesture inputs.

Various example embodiments of creating viewable content are explained with reference to FIGS. 1 to 7. Certain examples of images and schematic diagrams are used only for example purposes for facilitating the description of some example embodiments, and as such, these examples should not be considered as limiting to the scope of the present disclosure.

The terms 'image', 'digital image frame' and 'image frame' or 'frame' may have been used interchangeably throughout the description, and these terms refer to any single image/image frame capture of a scene or a single frame of the scene while capturing a video of the scene. For instance, one image frame generated during a video capture may be considered a single standalone image. Further, the terms 'viewport' and 'display' may have been used interchangeably throughout the description and these terms represent any display area on an electronic device used for displaying the viewable content. The term 'viewable content' refers to a multimedia content that can be displayed on the viewport of a device in response to a playback/view instructions of the viewable content. Examples of the viewable content is a video clip created from at least one multimedia content (e.g., image, video, and three dimensional object, etc.) using various example embodiments of the present disclosure.

Figure 1:
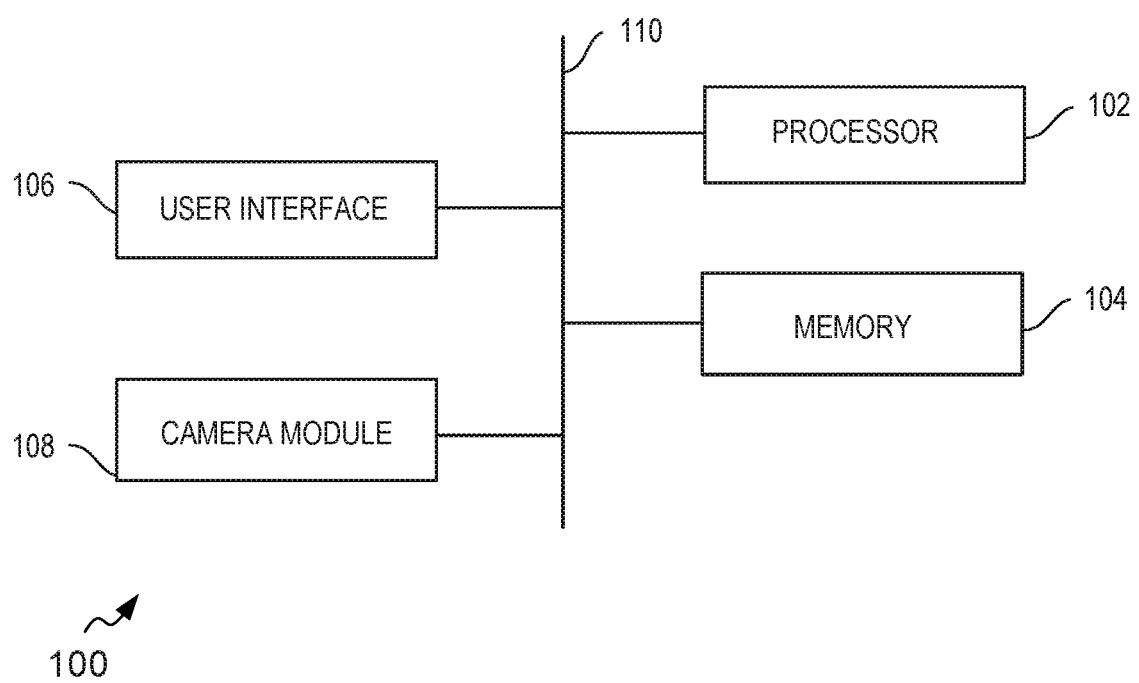
FIG. 1 illustrates a schematic block diagram representation of a device for creating viewable content, in accordance with an example embodiment of present disclosure.

FIG. 1 illustrates a schematic block diagram representation of a device 100 for creating a viewable content, in accordance with an example embodiment of the present disclosure. The device 100 as illustrated and hereinafter described is merely illustrative of an electronic device that could benefit from embodiments of the disclosure and, therefore, should not be taken to limit the scope of the disclosure. The device 100 may be employed on a variety of other devices both mobile and fixed. The device 100 may be an image capture device such as a digital camera, or any electronic device comprising image capturing or processing capabilities such as including, but not limited to, a mobile phone, a laptop computer, a tablet computer and a video recorder. Moreover, the device 100 may be implemented as a centralized device, or, alternatively, various components of the device 100 may be deployed in a distributed manner while being operatively coupled to each other. In an example embodiment, one or more components of the device 100 may be implemented as a set of software layers on top of existing hardware systems.

The device 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 102 utilizes computer program code to cause the device 100 to perform one or more actions, for example, capturing and performing post-processing of image, video or other graphic content.

The memory 104 may be embodied as one or more volatile memory devices, one or more non-volatile memory devices, and/or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.). The memory 104 may be configured to store information, data, applications, instructions or the like for enabling the device 100 to carry out various functions in accordance with various example embodiments. For example, the memory 104 may be configured to store instructions for execution by the processor 102. Additionally or alternatively, the memory 104 may be configured to store multimedia contents for processing by the processor 102.

The processor 102 is communicably coupled with the memory 104 and the communication interface 104. The processor 102 is capable of executing the stored machine executable instructions in the memory 104 or within the processor 102 or any storage location accessible to the processor 102. In at least one example embodiment, the memory 104 is configured to store computer program code for creating viewable content. The processor 102 may be embodied in a number of different ways. In an example embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

In at least one example embodiment, the device 100 includes a user interface 106 (also referred to as UI 106) for providing an output and/or receiving an input. The user interface 106 is configured to be in communication with the processor 102 and the memory 104. Examples of the user interface 106 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal display, active-matrix organic light-emitting diode (AMOLED) display, a microphone, a speaker, ringers, vibrators, and the like. In an example embodiment, the processor 102 may include user interface circuitry configured to control at least some functions of one or more elements of the user interface 106, such as, for example, a speaker, a ringer, a microphone, a display, and/or the like. The processor 102 and/or the user interface circuitry may be configured to control one or more functions of the one or more elements of the user interface 106 through computer program instructions, for example, software and/or firmware, stored in a memory, for example, the memory 104, and/or the like, accessible to the processor 102.

The device 100 includes a camera module 108, for example including one or more digital cameras. The camera module 108 is configured to be in communication with the processor 102 and/or other components of the device 100 to capture digital image frames, videos and/or other graphic media. The camera module 108 may include hardware and/or software necessary for creating a digital image frame from a captured image, or facilitating a viewfinder image frame of a scene in front of the camera module 108. For example, the camera module 108 may include hardware, such as a lens and/or other optical component(s) such as one or more image sensors. Examples of one or more image sensors may include, but are not limited to, a complementary metal-oxide semiconductor (CMOS) image sensor, a charge-coupled device (CCD) image sensor, a backside illumination sensor (BSI) and the like. Alternatively, the camera module 108 may include only the hardware for viewing a digital image frame, while a memory device of the device 100 stores instructions for execution by the processor 102 in the form of software for creating a digital image frame from a captured image. In an example embodiment, the camera module 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format.

The various components of the device 100, such as components (102-108) may communicate with each other via a centralized circuit system 110 to create viewable content on an interactive display in the device 100. The centralized circuit system 110 may be various devices configured to, among other things, provide or enable communication between the components (102-108) of the device 100. In certain embodiments, the centralized circuit system 110 may be a central printed circuit board (PCB) such as a motherboard, a main board, a system board, or a logic board. The centralized circuit system 110 may also, or alternatively, include other printed circuit assemblies (PCAs) or communication channel media.

Various example representations of interactive displays are shown in FIGS. 2A-2C, 3A-3D, 4A, 4B for the creation of the viewable content, and as shown in the FIGS. 2A-2C, 3A-3D, 4A, 4B, the representation of the interactive display changes depending upon on stages of the creation of the viewable content.

Figure 2A:
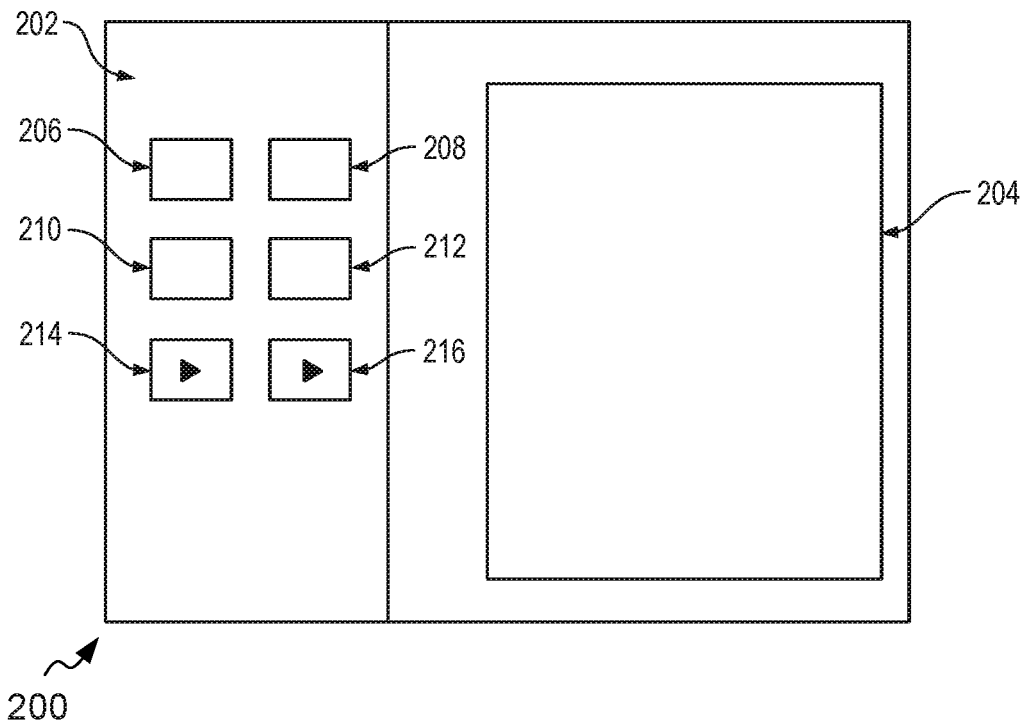
FIGS. 2A, 2B, 2C illustrate an example representation of an interactive display presented to a user for creation of a viewable content, in accordance with an example embodiment.
Figure 2B:
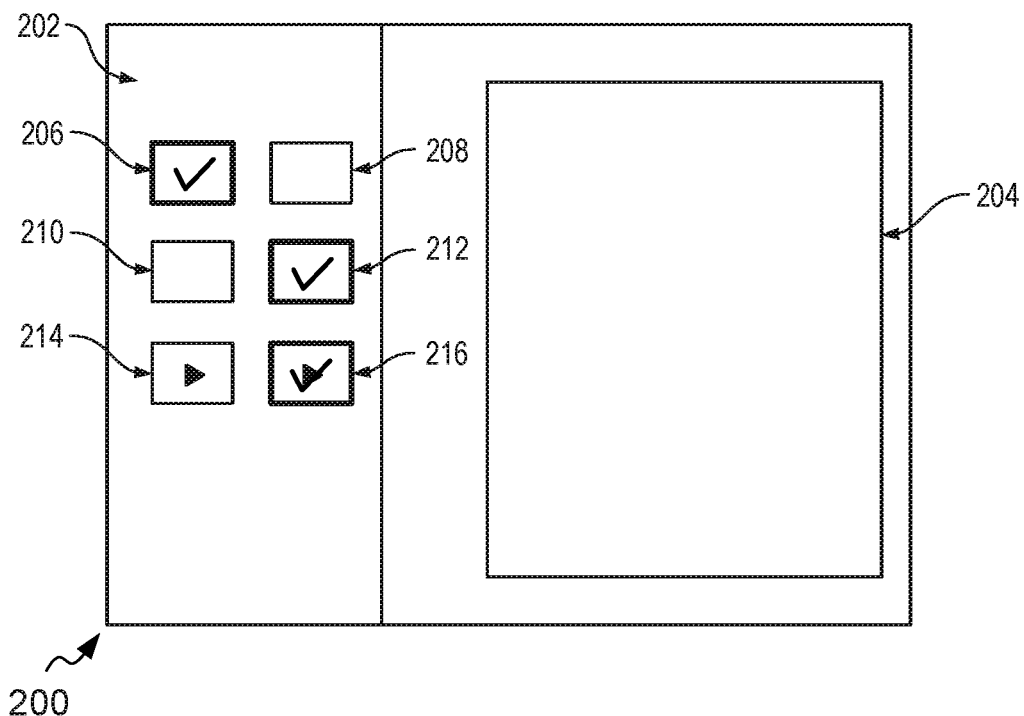
Figure 2C:
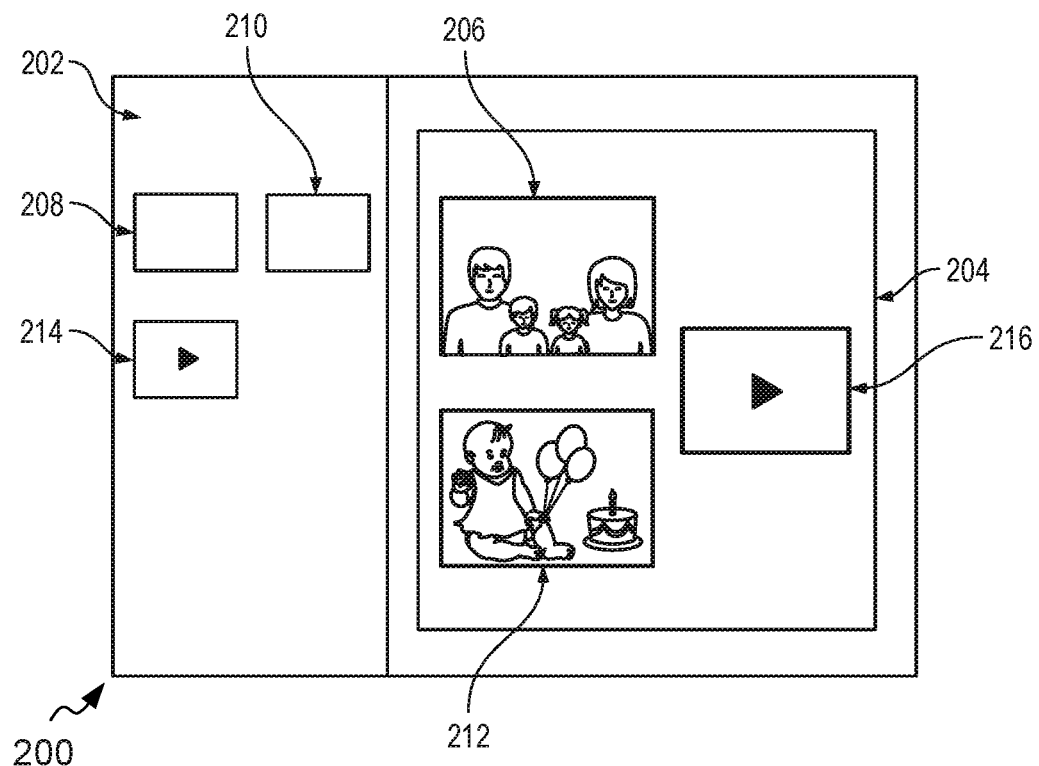

FIGS. 2A, 2B and 2C are example representations of an interactive display 200 presented to a user for creation of a viewable content. The processor 102 is caused, along with the content of the memory 104, to generate the interactive display 200 on a suitable UI, for example, the UI 106 of the device 100. An example of the UI 106 is a touch sensitive display. The interactive display 200 illustrated in FIGS. 2A-2C represents a collection of multimedia contents, and selection of one or more multimedia contents from the collection for the creation of the viewable content.

In the example representation of FIG. 2A, the interactive display 200 includes a selection panel displaying a collection 202 comprising at least one multimedia content on a left side of the interactive display 200 and a workspace 204 on a right side of the interactive display 200. The interactive display 200 is shown for illustration purpose only and it is to be understood that it may be presented to the user in different forms and the interactive display 200 may comprise one or more tool icons/buttons and/or tabs for facilitating creation/editing of the viewable content on the interactive display 200. In one form, the interactive display 200 may also include selectable options for example, buttons and tabs (not shown in FIGS. 2A-2C) for sharing the viewable content with online contacts of the user. Additionally, the interactive screen 200 may include selectable options for exporting the viewable content to storage such as cloud. In some forms, the collection 202 may appear in the same window as the workspace 204 or in a separate pop-up window for facilitating display of the pool of multimedia contents to the user.

In one form, the collection 202 includes thumbnail representations, listing, tiles, or other such representations of the pool of multimedia contents from which one or more multimedia contents may be selected by the user to create the viewable content. Examples of the multimedia contents in the collection 202 include, but are not limited to a video, a still image, a three dimensional (3-D) object and a living image. In this example representation, the collection 202 includes a first image 206, a second image 208, a third image 210, a fourth image 212, a first video content 214 and a second video content 216. In an embodiment, the images 206, 208, 210 and 212 and the video contents 214 and 216 may be accessed from a memory, such as, the memory 104 or from any external or internal storage device accessible to the device 100. Additionally or alternatively, the multimedia contents shown in the collection 202 may be imported or accessed from one or more image capturing devices communicably coupled with the device 100. Additionally or alternatively, the images 206, 208, 210 and 212 and the video contents 214 and 216 may be imported or accessed from any combination of the above sources.

In one form, the workspace 204 in the interactive display 200 is used by the user for creating the viewable content from the multimedia contents in the collection 202. For example, the images 206, 208, 210 and 212 and the video contents 214 and 216 of the collection 202 may be used to create the viewable content. In an embodiment, the viewable content is created in form of a video clip that is a collage of one or more selected multimedia contents and/or specific regions within the selected multimedia contents, wherein during the playback the viewable content is presented with desired effects as explained later with reference to FIGS. 5A-5L.

An example representation of selection of the one or more multimedia contents from the collection 202 is shown in FIG. 2B. In this example representation, the user selects the first image 206, the fourth image 212 and the second video content 216 from the collection 202 for creating the viewable content. The multimedia contents selected by the user from the collection 202 are representatively shown by a tick mark on the images 206, 212 and the video content 216 in FIG. 2B. It is understood that any number of multimedia content may be selected from the collection 202 for the creation of the viewable content. In an implementation, the images 206 and 212 and the video content 216 may be moved into the workspace 204 using a drag and drop button provided in the interactive display 200.

Referring now to FIG. 2C, an example representation of the selected multimedia contents for creating the viewable content on the interactive display 200 is shown. The multimedia contents of the collection 202 that are selected by the user are added to the workspace 204 of the interactive display 200. In this example representation, the images 206 and 212 and the video content 216 are added to the workspace 204. The user may provide various kinds of gesture inputs for selecting any object or region of interest and applying desired effects in the images 206 and 212 and the video content 216 that is to be produced in the final viewable content. In one form, the workspace 204 may have provisions for accepting user's gesture inputs for selecting regions of interest and for applying the desired effects to the selected region. In an embodiment, the multimedia contents (e.g., images 206 and 212 and the video content 216) selected by the user may appear as a collage on the workspace 204 of the interactive display 200 and may be rearranged by the user before creating the viewable content. The user may also chose to remove a multimedia content, for example, the first image 206 from the workspace 204. The workspace 204 provides the user with options to remove the selected multimedia content from the workspace 204 and/or add additional multimedia content (e.g., the images 208 and 210) from the collection 202 or from the memory such as the memory 104 or from other external sources. Additionally, the workspace 204 may provide options for the user to edit the multimedia contents that appear in any part of the interactive display 200. For instance, if the brightness of the image 208 has to be increased, the user may select the image 208 and add the image 208 to the workspace 204. Thereafter, the user may work on improving the brightness of the image 208 using tools (not shown) provided within the workspace 204.

Figure 2D:
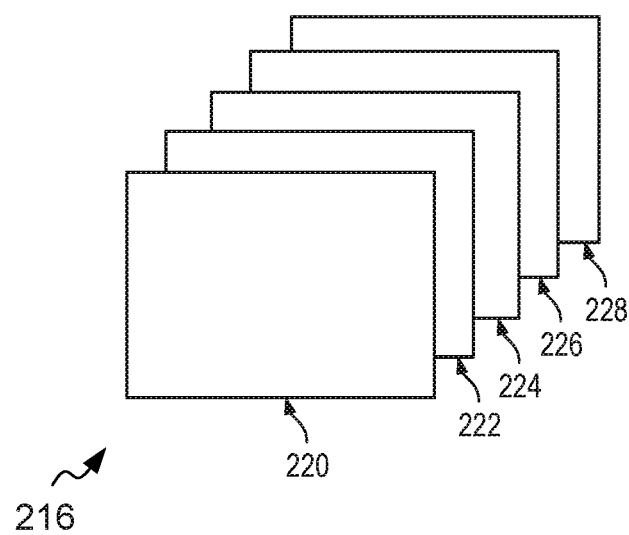
FIG. 2D illustrates an example representation of a video content in a workspace, in accordance with an example embodiment.
Figure 2E:
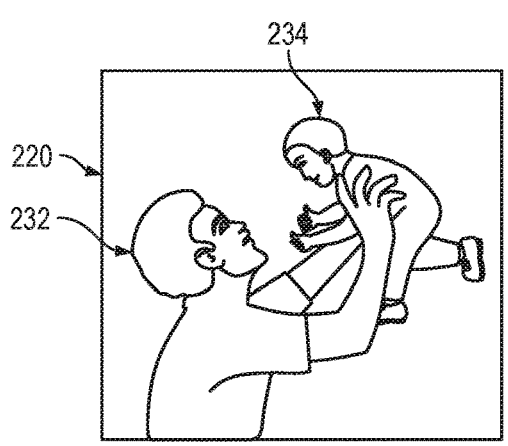
FIGS. 2E, 2F, 2G, 2H, 2I illustrate an example representation of frames in the video content, in accordance with an example embodiment.
Figure 2F:
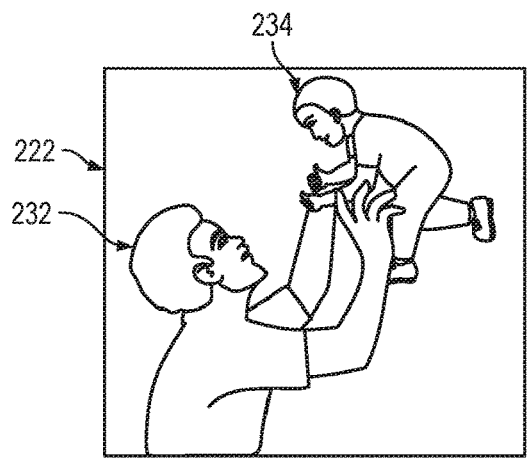
Figure 2G:
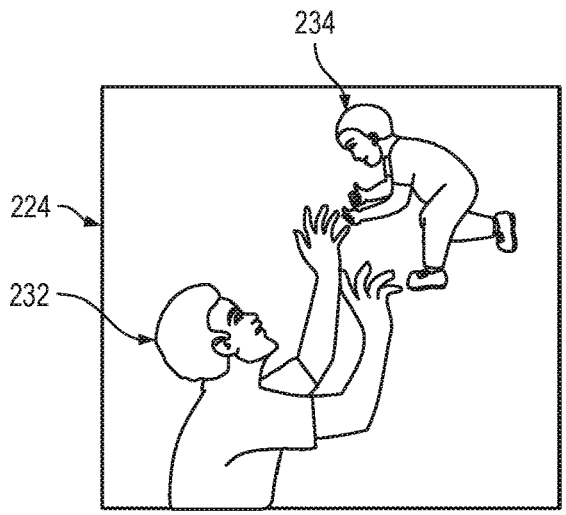
Figure 2H:
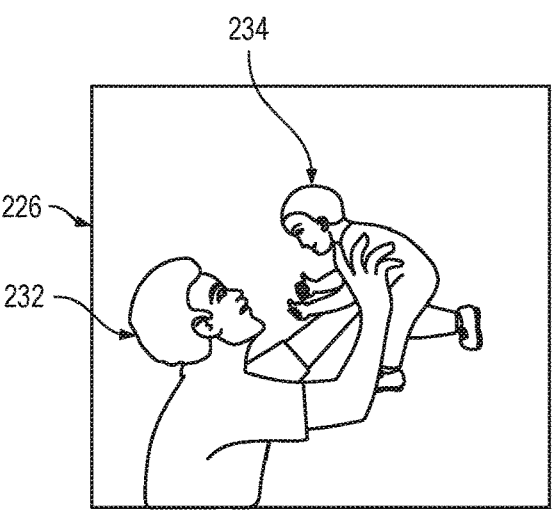
Figure 2I:
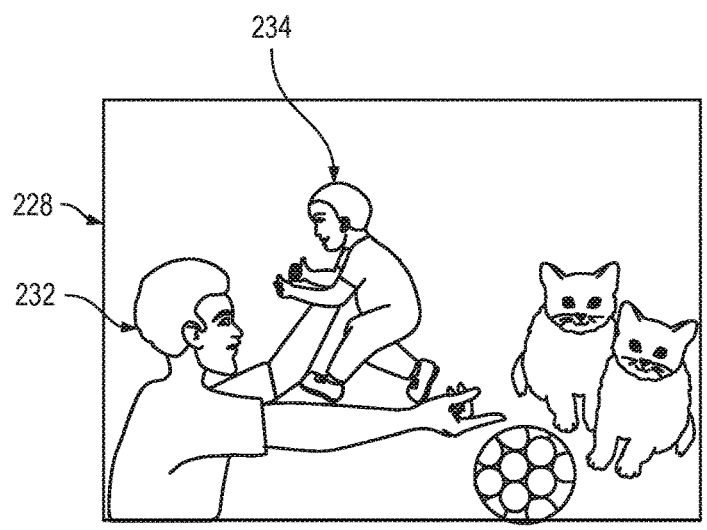

The user may also view the contents of the video content 216 using a play button within the workspace 204. Referring now to FIG. 2D, an example representation of the video content 216 in the workspace 204 is shown. The video content 216 depicts a sequence of events by means of consecutive frames that were recorded while capturing a video of the event. For instance, the second video content 216 includes a first frame 220, a second frame 222, a third frame 224, a fourth frame 226 and a fifth frame 228 depicting the event. The frames 220-228 correspond to consecutive image frames constituting the video content 216. In one form, the duration of the video content 216 corresponding to the event may be clipped to display only a selected portion of the video content 216. For instance, the workspace 204 may have provisions or tools for clipping the video content 216 to a desired portion.

Referring now to FIGS. 2E, 2F, 2G, 2H and 2I, an example representation of the frames 220-228 in the video content 216 is shown. The sequence of events corresponding to the frames 220-228 of the video content 216 are shown in FIG. 2E-2I. In this example representation, the frames 220-228 associated with the video content 216 show a person 232 playing with a baby 234. The sequence of events associated with the video content 216 that depicts the person 232 playing with the baby 234 are captured by consecutive image frames 220-228.

The user may create the viewable content in the workspace 204 by providing one or more gesture inputs on the multimedia contents selected from the collection 202. In one form, the device 100 is configured to receive gesture inputs in form of finger touch, pen or stylus inputs, hover-type inputs, inputs from mouse, touch pad or trackball, or any combination thereof. Some example representations of providing gesture inputs in the workspace 204 for the creation of the viewable content are shown in FIGS. 3A-3D.

Figure 3A:
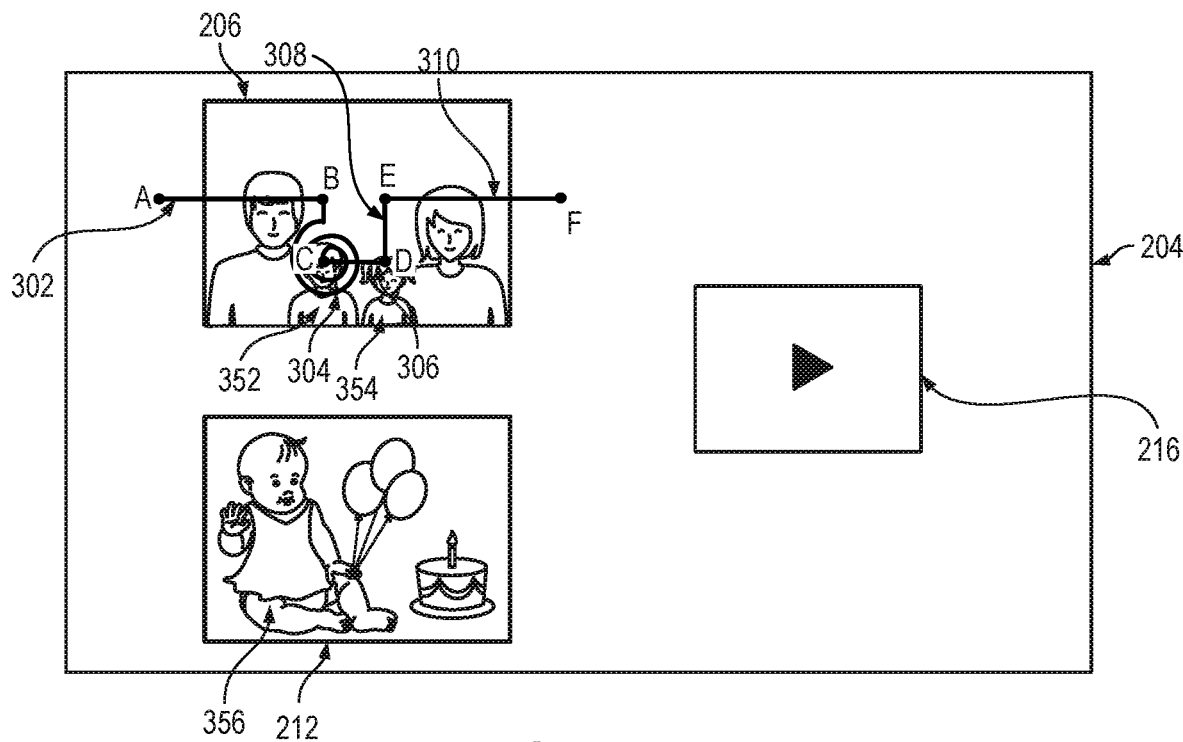
FIGS. 3A, 3B, 3C, 3D illustrate an example representation of creating a viewable content using multimedia contents in a workspace, in accordance with an example embodiment.

Referring now to FIG. 3A, an example representation of creating a viewable content from the multimedia contents in the workspace 204 is shown in accordance with an example embodiment. In one use scenario, the user decides the sequence of frames (of images and videos) for creating the viewable content, for example, in the order of image 206, the video content 216 and the image 212. It is noted that each of the user's gesture inputs may be predefined or customized by the user so as to either generate a corresponding desired effect during playback or to select or highlight regions of interest in the multimedia contents during the payback of the viewable content. For example, a gesture input of a straight line may indicate a direction of pan in the viewport of the device 100 during playback of the viewable content. In another example, a gesture input of a spiral-in pattern over an object may indicate zoom-in view of the object in the viewport of the device 100 during the playback of the viewable content. Similarly, other gesture inputs may be defined to indicate corresponding effect on the playback of the viewable content.

In the example representation of FIG. 3A, the device 100 receives the gesture input from the user starting from an entry point 'A' near the image 206 in the workspace 204. As described earlier, the gesture inputs may be received from the user using a variety of input sources such as stylus, pen, fingers' touch, etc., or by means of an input or peripheral device capable of interacting with the user interface 106 of the device 100.

As shown in FIG. 3A, the user draws a fairly straight line 302 from the entry point 'A' to a point 'B' on the image 206 indicating a direction of pan for the viewport during playback of the viewable content. In this example, the user further decides to highlight a region (e.g., face of a boy 352) in the image 206 at the time of the playback of the viewable content, and accordingly the user may provide a dedicated gesture input for highlighting the desired region in the image 206. Without limiting to the scope of the present disclosure, in an example, a spiral-in pattern 304 on a region of interest may be defined to create an effect of zooming-in the region of interest (e.g., displaying an enlarged view of the region of interest on the viewport) during the playback. In this example, the user decides to highlight the face of the boy 352 in the image 206 for which the user draws a spiral-in pattern 304 over the face of the boy 352, for example as shown from the point 'B' to a point 'C'. During playback, based on the spiral-in pattern 304 from point 'B' to the point 'C', the device 100 is caused to display an enlarged version of the face of the boy 352 on the viewport. Further, the user draws a straight line 306 from the point 'C' to a point 'D' that indicates that the image pans to the right displaying the girl 354 on the viewport during the playback. Further, the user draws a straight line 308 from the point 'D' to a point 'E' and continues to draw another straight line 310 from the point 'E' to a point 'F' that indicates the direction of pan i.e. away from the image 206.

Figure 3B:
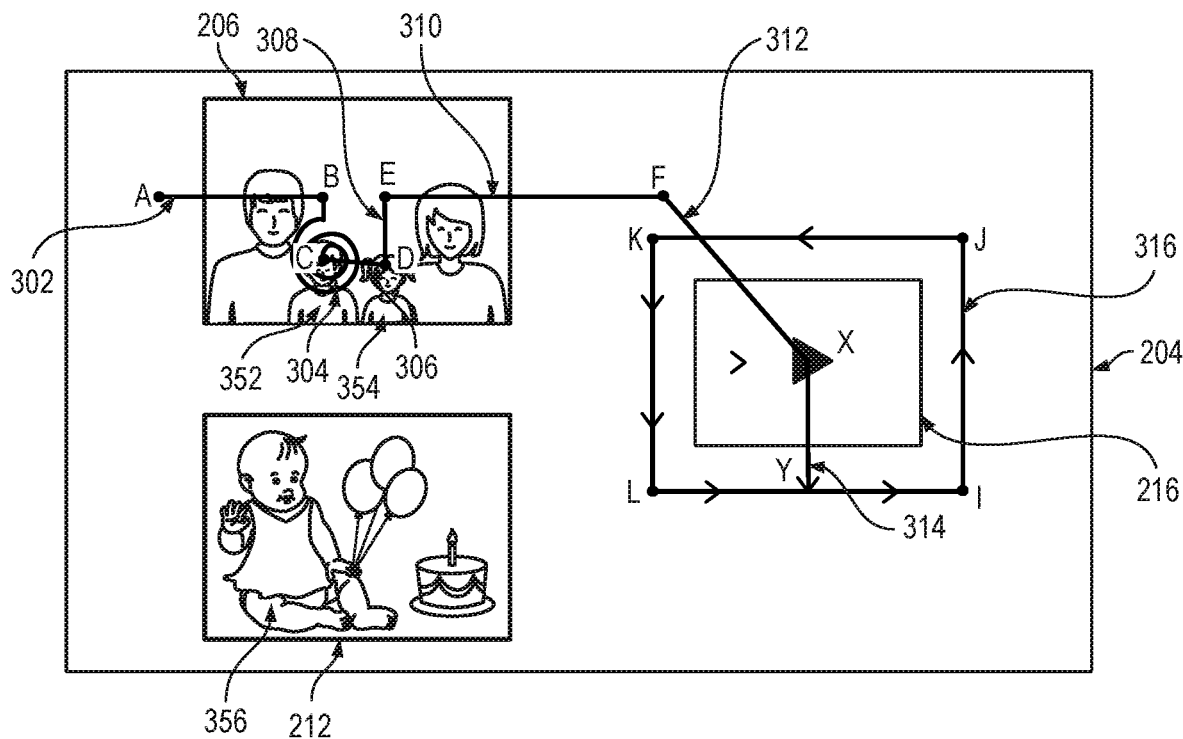

The user may further wish to include regions of interests from the video content 216 and the image 212 in the viewable content, as explained with reference to FIGS. 3B and 3C. For example, as shown in FIG. 3B, the user decides to display the video content 216 after the image 206 in the viewable content. The user extends a straight line 312 from the point 'F' to a point 'X' that corresponds to a point (e.g., center) on the video content 216. In one form, the user draws a fairly straight line 314 from the point 'X' on the video content 216 to a point 'Y' and proceeds to draw a square 316 (shown as covered by points 'YIJKLY') encasing the video content 216. In an example, a gesture input of the square 316 indicates that during playback of the viewable content, the viewport should pan to the video content 216 and displays all frames 220-228 (e.g., see FIGS. 2E-2I, respectively) of the video content 216 after panning out from the image 206.

Further, in this example representation, the user decides to display the image 212 after the video content 216 in the viewable content. As shown in FIG. 3C, the user draws a straight line 318 from the point 'Y' to a point 'M' that corresponds to a point associated with face of a baby 356 in the image 212. The straight line 318 indicates the direction of pan for the viewport from the video 216 to the image 212 during playback of the viewable content.

In this use case scenario, the user may want to zoom out the image 212 including the face of the baby 356, and accordingly, the user draws a spiral-out pattern 320 (starting from the point 'M' to a point 'N') to cover the entire image 212 in the workspace 204 of the interactive display 200. In this example representation, the viewport will pan from the video content 216 to the point 'M' corresponding to the point associated with the face of the baby 356 and the viewport will zoom out displaying the image 212 during playback of the viewable content. The playback of the viewable content is described with reference to FIGS. 5A-5L. In an embodiment, the speed of the viewport movement for zooming-out and displaying the image 212 is associated with the speed of the spiral-out pattern 320 as drawn by the user. For instance, if the user provides the gesture input of the spiral-out pattern 320 from the point 'M' to the point 'N' on the image 212 slowly (say in 5 seconds), the image 212 is zoomed out slowly for the 5 seconds during the playback of the viewable content. In this example representation, the point 'N' marks the exit point of the viewport for the image 212 after the spiral-out pattern 320 on the image 212.

Figure 3C:
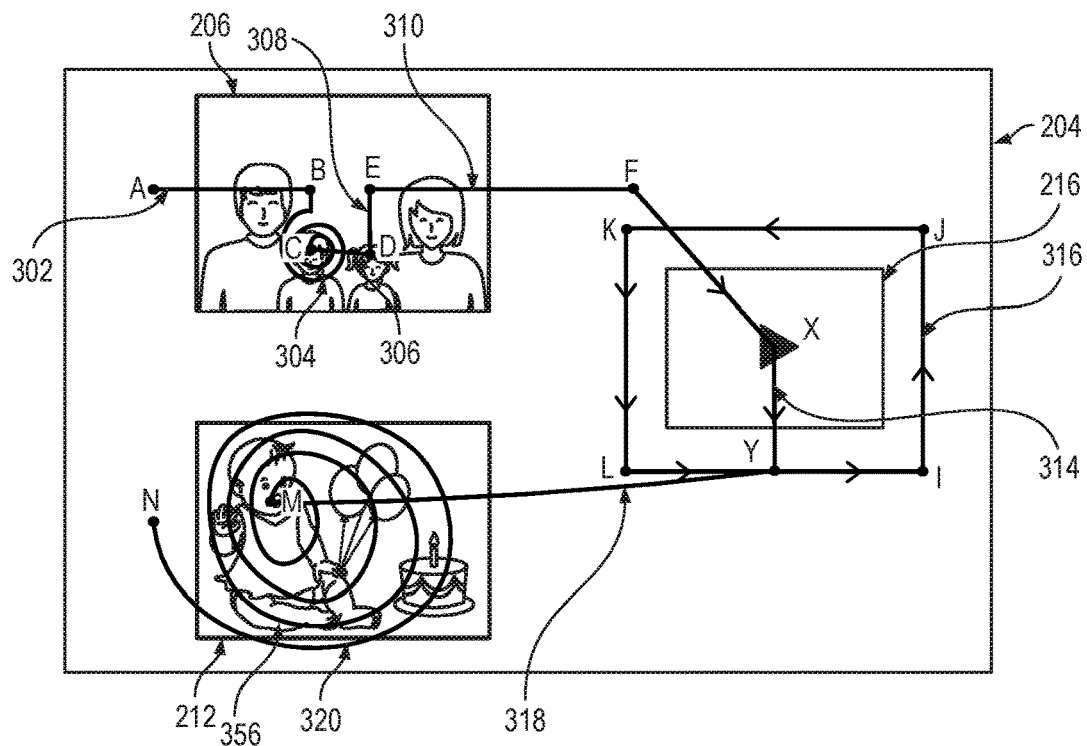
Figure 3D:
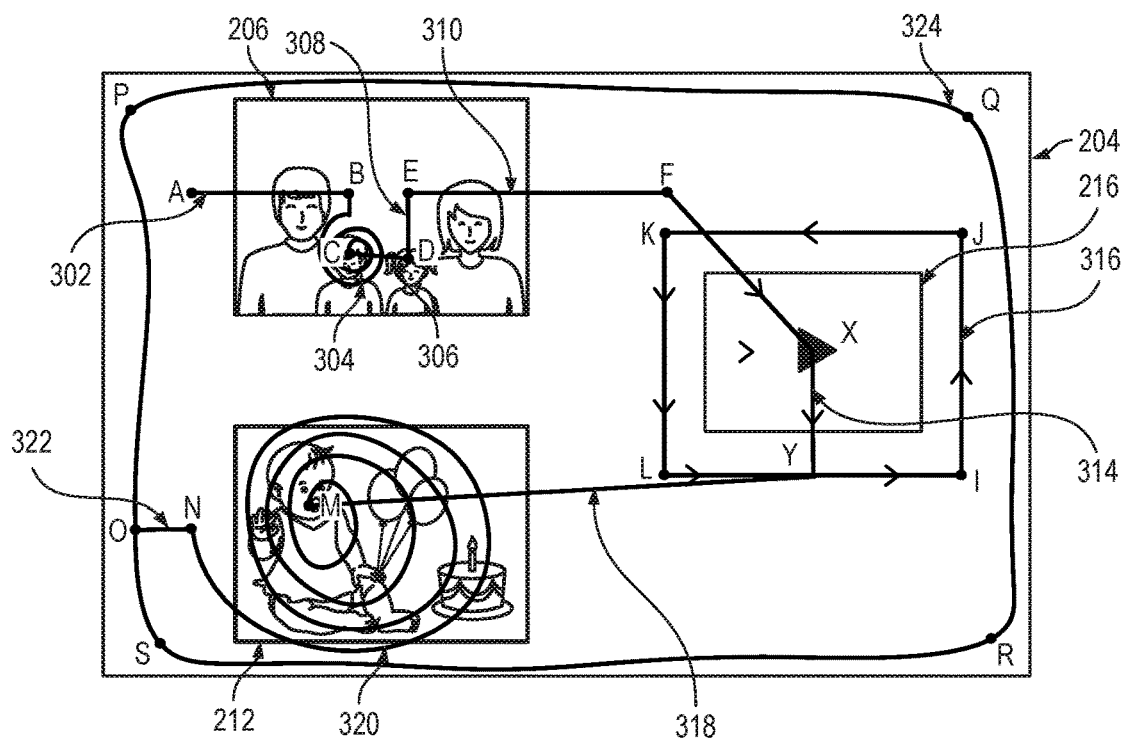

Optionally, the user may draw a fairly straight line 322 from the point N to a point 'O' in the workspace 204, as shown in FIG. 3D. Thereafter, the user provides the gesture input in form of a closed loop (e.g., see 324 covered by loop connecting the points OPQRSO) starting from the point 'O' encasing the images 206, 212 and the video content 216. During the playback, the closed loop 324 indicates the viewport to zoom out and show a part of the workspace 204 that is covered by the closed loop 324. Thereafter, the user may mark the end of playback of the viewable content by lifting a finger/stylus/pen or by not providing any gesture inputs via other input means.

Only some examples of the gesture inputs and their corresponding effects on the playback of the viewable content are described herein, however it should be noted that any kind of specific gesture input patterns may be dedicated for effects including but not limited to zoom-in, zoom-out, pan, blur, transitions between the multimedia contents, and pause a particular frame of the multimedia content for a predetermined time interval. Herein, an effect on a multimedia content by means of gesture inputs represents any kind of change/alteration in the visual appearance of at least a part (e.g., a region of interest) of the multimedia content at the time of playback. Further, the speed of the gesture input and any other attributes (e.g., touch pressure, tapping pattern, etc.) may also be associated with a corresponding desired effect during the playback.

In an example embodiment, the device 100 is caused to store one or more traces of the user's gesture inputs during creation of the viewable content. For instance, the device 100 is caused to store information of movement of the user's fingers, speed of movement, pressure applied while moving the finger, at a storage location such as the memory 104. The device 100 is also caused to edit one or more sections of the stored one or more traces of the user's gesture inputs for editing the viewable content, as described with reference to FIGS. 4A and 4B.

Figure 4A:
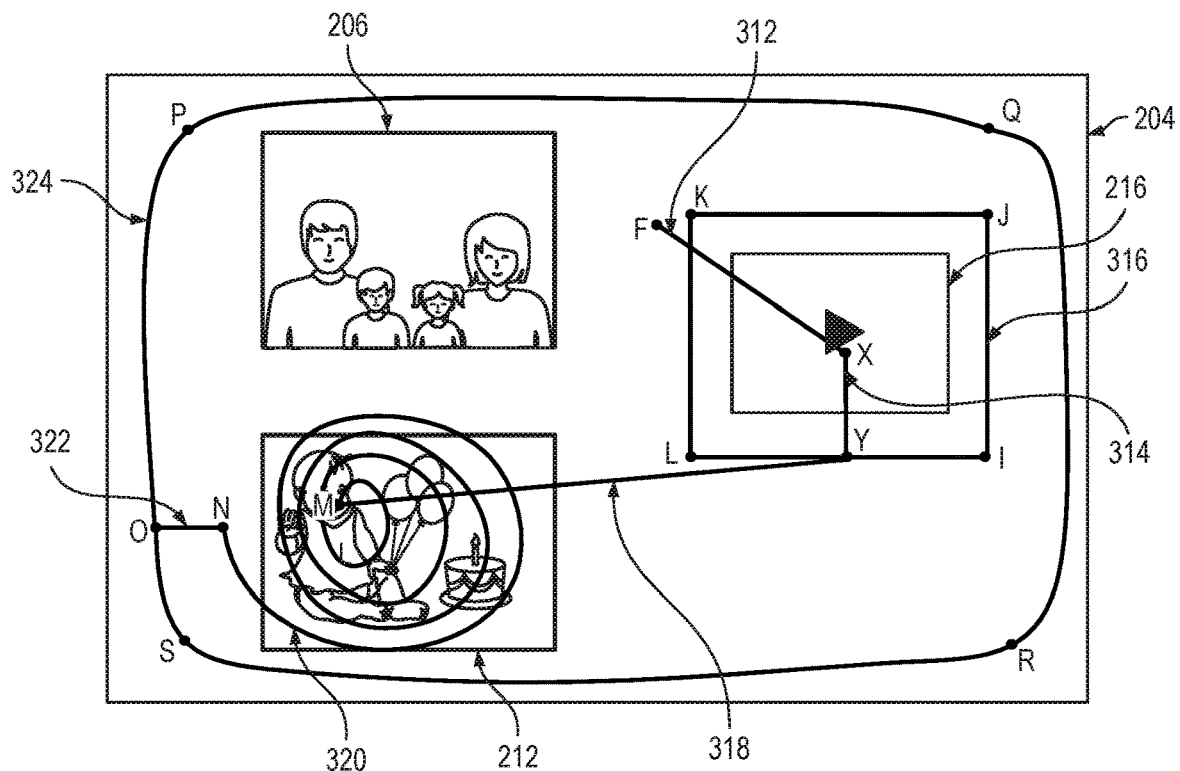
FIGS. 4A, 4B illustrate an example representation of editing a viewable content, in accordance with an example embodiment.

Referring now to FIG. 4A, an example representation of editing of a viewable content is shown, in accordance with an embodiment of the present disclosure. In an embodiment, the user can edit one or more traces of the gesture inputs provided by the user on the multimedia contents in the workspace 204. For example, the user has provided a gesture input (e.g., the spiral-in pattern 304) for zooming in the boy 352 in the image 206 as explained with reference to FIG. 3A. In the use case scenario, the user decides to remove the effect of the spiral-in pattern 304 drawn over the boy 352 in the image 206. In one form, the user may use a tool to erase the trace corresponding to the spiral-in pattern 304 on the image 206. It should be noted that the desired effects applied on the multimedia content in the workspace 204 may be removed either by using an input device capable of interacting with the user interface 106 (shown in FIG. 1) or a software tool (e.g., an eraser tool) provided within the workspace 104 for erasing traces of gesture inputs in the workspace 204.

Referring to FIGS. 3A and 4A, the user decides to highlight the girl 354 in the image 206 instead of the boy 352, and accordingly, the user removes or erases the traces of recorded gesture inputs corresponding to the straight line 302 between the points 'A' and 'B', the spiral-in pattern 304 drawn on the boy 352, the straight line 306 between the points 'C' and 'D' that indicate direction of pan and optionally the straight lines 308 and 310 between the points 'D' and 'E' and between the points 'E' and 'F', respectively.

Figure 4B:
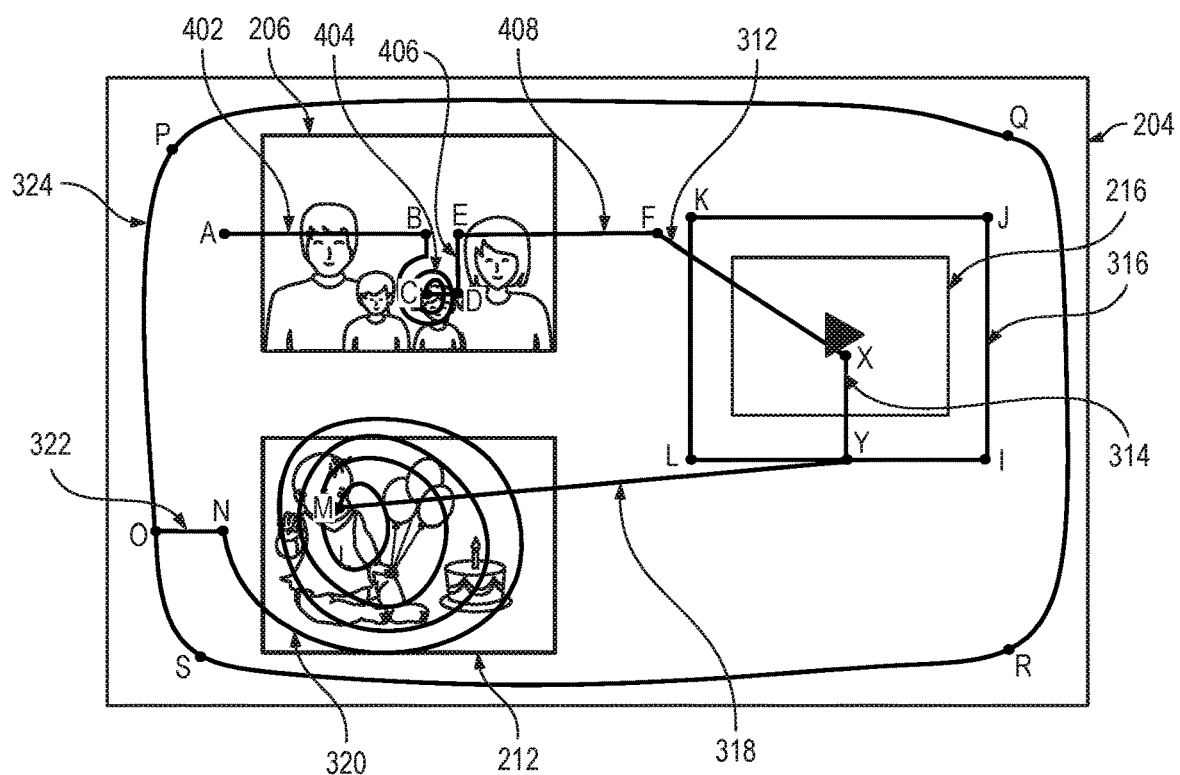

An example representation of editing the viewable content is further shown in FIG. 4B. For instance, the user removes the effects applied on the image 206 and applies new effects corresponding to highlighting the girl 354 in the image 206. For instance, the user draws a fairly straight line 402 from a point 'A' in the workspace 204 to a point 'B' in the image 206. The straight line 402 indicates the direction of pan for the image 206 during playback of the video content. The girl 354 in the image 206 is highlighted by applying a spiral-in pattern 404 from the points 'B' to 'C' and a fairly straight line from the point 'C' to a point 'D' on the image 206. Further, the user draws a straight line 406 from the point 'D' to the point 'E' and thereafter a straight line 408 from the point 'E' to 'F' indicating the direction of pan for the viewport while displaying the image 206. It is noted that the traces corresponding to the gesture inputs provided over the video content 216 and the image 212 remain unchanged.

In an example embodiment, once the creation of the viewable content is complete, at least one of the viewable content and the traces associated with the gesture inputs on the multimedia contents in the workspace 204 is stored. In an example, if the viewable content is stored in the memory for example the memory 104, the viewable content can be played back (or shared with different devices) directly by accessing the memory 104 by the processor 102. Alternatively or additionally, if only the traces associated with the gesture inputs provided by the user are stored, the viewable content can be generated based on the traces at the time of playback (e.g., upon receiving a command for playback of the viewable content). Alternatively or additionally, the traces may be stored in form of metadata along with the multimedia contents used in the viewable content, and the viewable content can be generated on the fly at the time of playback.

An example representation of the playback of the viewable content is shown in FIGS. 5A-5L. Without limiting to the scope of the present disclosure, the playback of the viewable content is shown in form of sequence of frames 502-524, where the viewable content is created based on the example scenario explained with reference to FIGS. 3A-3D and editing of the viewable content as explained with reference to FIGS. 4A-4B.

The viewable content can be accessed from the memory, for example, memory 104, associated with a user device (e.g., the device 100) for performing a playback of the viewable content, or alternatively the viewable content can be generated based on accessing the stored multimedia contents and applying the stored gesture inputs on the multimedia contents. The viewable content is played back on the viewport in a sequence based on a sequence of the gesture inputs provided by the user while creating the viewable content. Further, the playback also includes producing the desired effects on the multimedia contents based on the corresponding gesture inputs. FIGS. 5A-5L depict the sequence of frames 502-524 during playback of the viewable content, associated with the desired effects applied on the multimedia contents in the workspace 204 as explained with reference to FIGS. 3A-3D and FIGS. 4A and 4B.

Figure 5A:
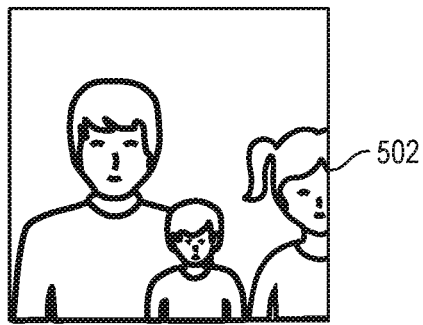
FIGS. 5A-5L illustrate an example representation of playback of the viewable content, in accordance with an example embodiment.

As shown in FIG. 5A, the viewport pans the image 206 from a first side (e.g., the left) to a second side (e.g., the right) displaying the left portion of the image 206 as seen in a frame 502. The direction of pan of the viewport displaying the frame 502 is indicated by the straight line 402 drawn by the user on the image 206 in the workspace 204 as described with reference to FIG. 4B.

Figure 5B:
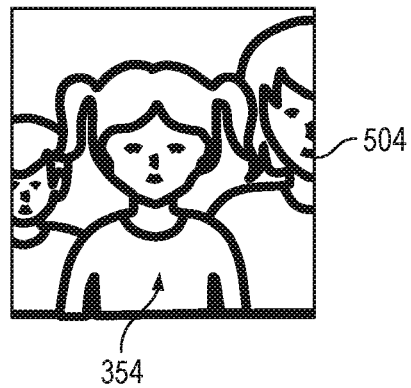
Figure 5C:
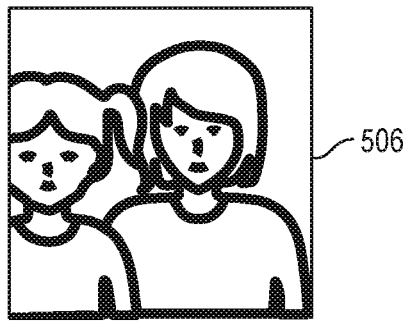
Figure 5D:
Figure 5E:
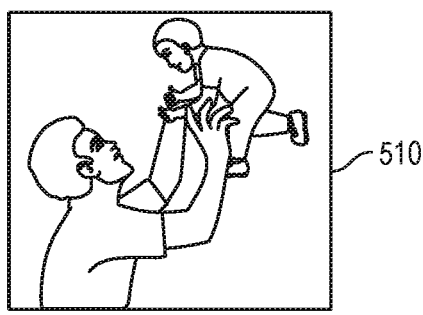
Figure 5F:
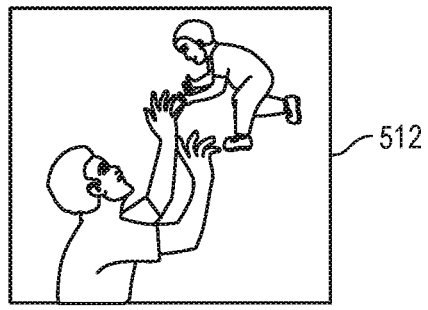
Figure 5G:
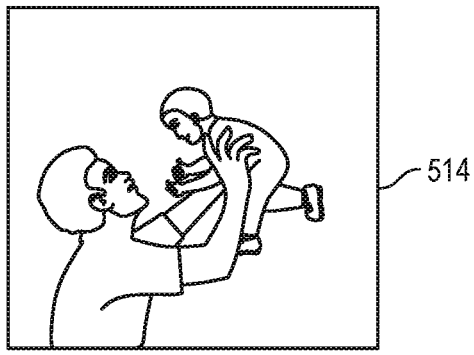
Figure 5H:
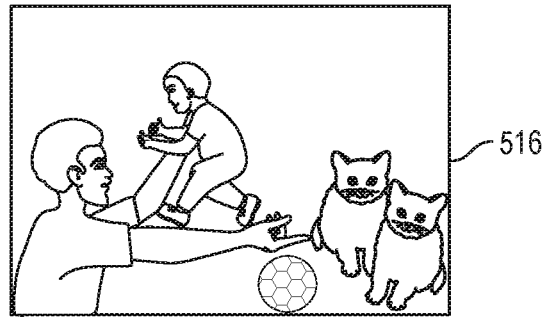

In the example representation of the viewport shown in FIG. 5B, a frame 504 represents a zoom-in view of the girl 354 in the image 206, as while creating the viewable content a gesture input corresponding to the spiral-in pattern 404 (shown in FIG. 4B) is provided on image region associated with the girl 354. In an embodiment, the viewport zooms in to show the girl 354 in the image 206 at a speed proportional to the speed of the gesture input (e.g., the spiral-in pattern 404) provided by the user while creating the viewable content. In FIG. 5C, the viewport pans right as indicated by the straight lines 406 and 408 (shown in FIG. 4B, movement between the points 'C' to 'F') to display the frame 506 that shows another person on the right of the girl 354 in the image 206.

Further examples of the viewport are shown in FIGS. 5D-5H, in which frames 508, 510, 512, 514 and 516 correspond to the video content 216 included in the viewable content (e.g., refer FIGS. 2E, 2F, 2G, 2H, 2I and FIG. 3B). In this example representation, the frames 508 to 516 are displayed consecutively in the viewport during the playback of the viewable content. As already explained, the user provides a gesture input that corresponds to a direction of pan from the image 206 to the video content 216 (indicated by the straight lines 408 and 312) prior to a gesture that corresponds to a square pattern 316 (see, 'IJKLI' in FIG. 3B) encasing the video content 216. In an example embodiment, the processor 102 decodes the gesture pattern 316 and displays the frames 220 to 228 associated with the video content 216 in the viewport as representatively shown in form of the frames 508 to 516.

Figure 5I:
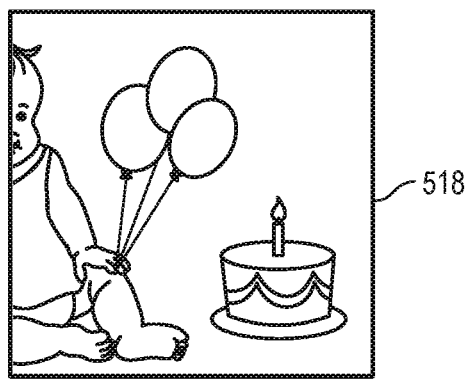
Figure 5J:
Figure 5K:

Further, an example representation of the next display in the viewport is shown in FIG. 5I, where a frame 518 shows a right portion of the image 212 (shown in FIG. 3C). The viewport pans from the frame 516 associated with the video content 216 to the image 212 in the workspace 204 as indicated by a gesture input (e.g., the straight line 318) provide by the user. The viewport pans towards the left from the frame 516 to display a right portion of the image 212 that corresponds to a cake. The viewport pans further left to the point 'M' associated with face of a baby 356 in the image 212. Further, FIG. 5J representatively shows a next display in the viewport (e.g., frame 520) that corresponds to a zoom out effect in response to the spiral-out pattern 320 performed on the image 212 while creating the viewable content. For instance, as explained with reference to FIG. 3C, the user has provided a gesture input (e.g., the spiral-out pattern 320) for zooming out the image 212 and accordingly, the frame 520 represents a zoom out view of the image 212. In an embodiment, the rate at which the image 212 may be zoomed out from the point 'M' may be proportional to the speed of the user providing the spiral-out pattern 320 input. The desired effect corresponding to zooming out includes displaying the entire image 212 as shown in the frame 522.

Figure 5L:
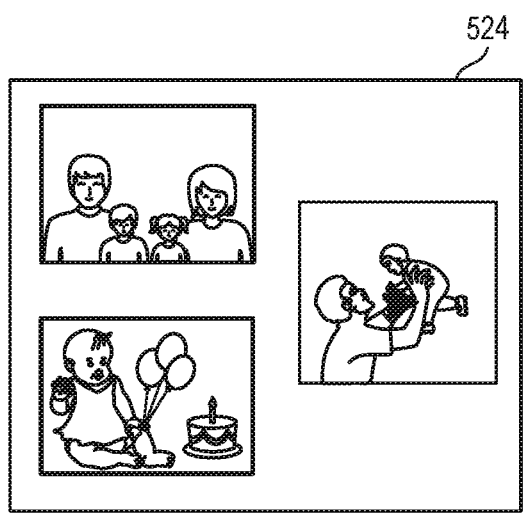

Further, the viewport generated in response to the closed loop 324 (see, FIG. 3D) is shown in FIG. 5L, where a frame 524 corresponds to regions encased by the closed loop 324 comprising the images 206 and 212 and the video content 316. Thereafter, the playback of the viewable content (e.g., the clip) ends as the user stopped providing gesture input (e.g., by lifting the pen off the screen) for marking the end of the viewable content.

Figure 6:
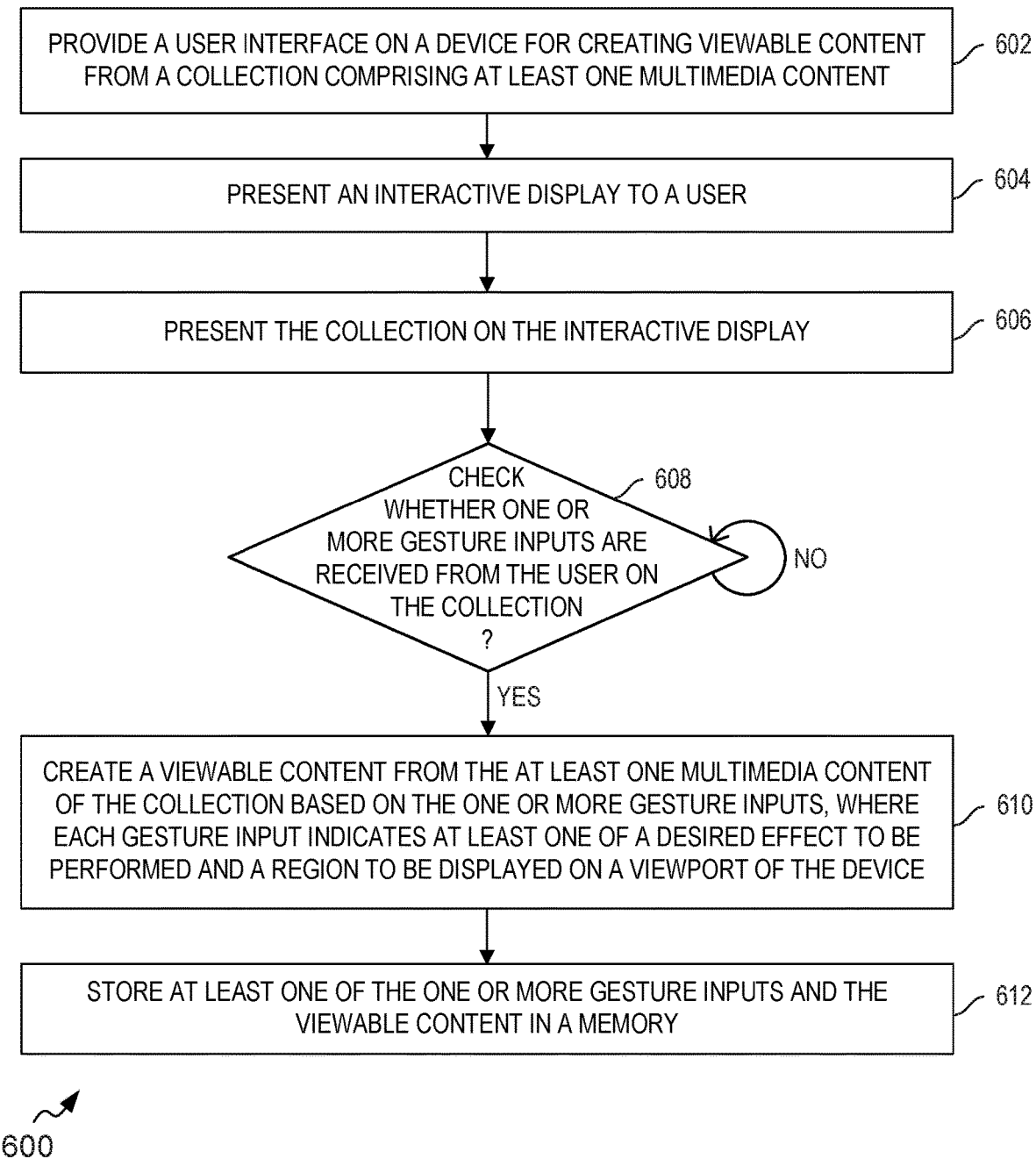
FIG. 6 illustrates an example flow diagram of a method for creating a viewable content, in accordance with an example embodiment.

FIG. 6 is a flowchart depicting an example method for creating viewable content, in accordance with an example embodiment. The method 600 is shown and explained with reference to previously described Figures. The method 600 depicted in the flowchart may be executed by, for example, the device 100 of FIG. 1.

At operation 602, the method 600 includes providing a user interface on a device for creating viewable content from a collection comprising at least one multimedia content. In an example embodiment, the collection comprises at least one multimedia content (e.g., image, video, and 3-D object). The multimedia content may be retrieved from the user device, for example, the device 100 associated with the user. Alternatively, the multimedia content may be accessed from media capturing devices or storage devices external to the user device for creating the viewable content. In an example embodiment, the user may use a viewable content creation application installed in the user device or otherwise accessible to the user device, for creating the viewable content from the collection.

At operation 604, the method 600 includes causing the user interface, by a processor (e.g., the processor 102) to present an interactive display to the user. In an embodiment, the interactive display (e.g., the interactive display 200) may be used by the user to select at least one multimedia content from a collection comprising multimedia contents, to select regions of interest in the at least one multimedia content and to apply effects on the selected regions in the at least one multimedia content.

At operation 606, the method 600 includes presenting the collection on the interactive display. In an embodiment, the at least one multimedia content selected by the user is presented on the display, for example, the UI 106, for the user to create the viewable content. The selection of multimedia content is explained with reference to FIG. 2B.

At operation 608, it is checked whether one or more gesture inputs are received from the user on the collection. If the one or more gesture inputs are not received, the method 600 waits for its receipt. Once the one or more gesture inputs are received, the method 600 proceeds to operation 610. In an embodiment, each gesture input indicates at least one of a desired effect to be performed and a region to be displayed on a viewport of the device. In an embodiment, the user may use the interactive display to select regions of interest for applying different effects. In an embodiment, the user may use hand gestures for indicating direction of pan of the viewport, zooming in and zooming out for highlighting regions of interest. For instance, zooming in to enlarge a region of interest is performed when the user gestures are associated with a spiral-in pattern on the region of interest. It must be noted that the effects described above are for example purposes only and other such effects may be performed on the multimedia content in the interactive display for creating the viewable content. The desired effects associated with the one or more gesture inputs received on the at least one multimedia content is already explained with reference to FIGS. 3A-3D.

At operation 610, the method 600 includes creating a viewable content based on the one or more gesture inputs. In an embodiment, the viewable content is created from the at least one multimedia content selected by the user based on the selected regions and the effects applied to the selected regions by means of hand gestures on the interactive display. An example of the viewable content created using hand gestures is explained with reference to FIGS. 3A-3D. In an embodiment, the speed of the viewport movement displaying the at least one multimedia content with desired effects is based on the speed of the user providing the gesture inputs to apply desired effects. For instance, if time taken by the user to draw a straight line by means of gesture input in a particular direction (e.g., left to right) on an image to indicate direction of pan is 4 seconds, the image will pan from left to right for 4 seconds during the playback.

At operation 612, the method 600 includes storing at least one of the one or more gestures and the viewable content in a memory. In an embodiment, the one or more gestures corresponding to patterns drawn by the user on the at least one multimedia content are stored in a memory, for example, the memory 104. In an embodiment, the one or more gestures on the collection comprising the at least one multimedia content may be edited.

One or more example embodiments of a method of creating a viewable content on an interactive display are described herein with reference to FIG. 6. The disclosed method 600 can be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 7:
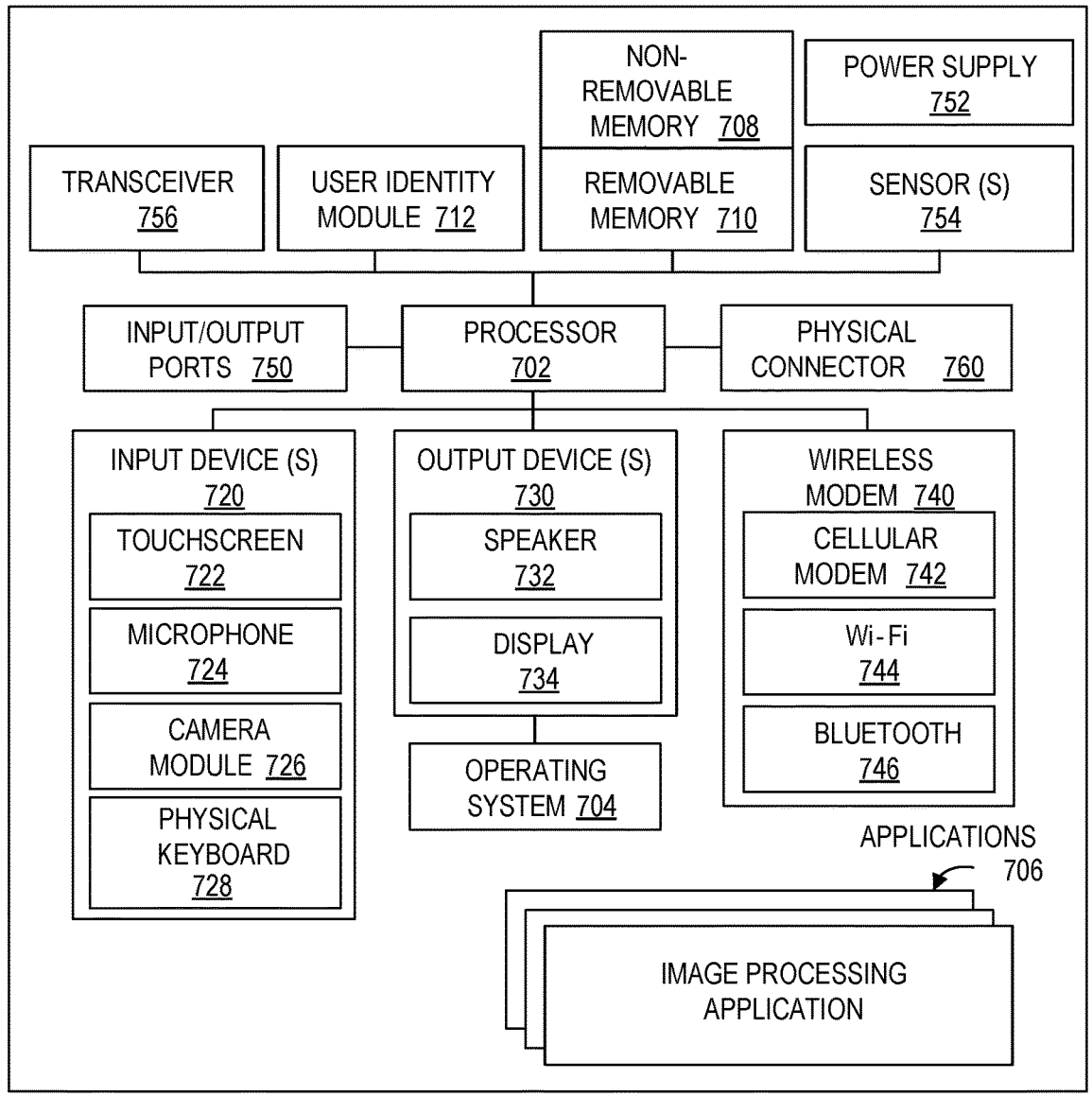
FIG. 7 illustrates an example of a mobile device capable of implementing example embodiments described herein.

Referring now to FIG. 7, a schematic block diagram of a mobile device 700 is shown that is an example of the device 100. The mobile device 700 as illustrated and hereinafter described is merely illustrative of one type of device and should not be taken to limit the scope of the embodiments. As such, it should be appreciated that at least some of the components described below in connection with the mobile device 700 may be optional and thus in an example embodiment may include more, less or different components than those described in connection with the example embodiment of FIG. 7. As such, among other examples, the mobile device 700 could be any of mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 700 includes a controller or a processor 702 (e.g., a signal processor, microprocessor, ASIC, or other control and processing logic circuitry) for performing tasks such as signal coding, data processing, image processing, input/output processing, power control, and/or other functions. An operating system 704 controls the allocation and usage of the components of the mobile device 700 and provides support for one or more applications programs (see, image processing application 706) associated with access control of the mobile device 700 or of any application installed on the mobile device 700 that implements one or more of the innovative features described herein. In addition to access control/image processing application, the application programs can include image capturing applications, common mobile computing applications (e.g., telephony applications, email applications, calendars, contact managers, web browsers and messaging applications) or any other computing application.

The illustrated mobile device 700 includes one or more memory components, for example, a non-removable memory 708 and/or removable memory 710. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. Example of data can include web pages, text, images, sound files, image data, video data, or other data sets to be sent to and/or received from one or more network servers or other devices via one or more wired or wireless networks. The mobile device 700 may further include a user identity module (UIM) 712. The UIM 712 may be a memory device having a processor built in. The UIM 712 may include, for example, a SIM, a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA).

The mobile device 700 can support one or more input devices 720 and one or more output devices 730. Examples of the input devices 720 may include, but are not limited to, a touch screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to a speaker 732 and a display 734. Other possible output devices (not shown) can include piezoelectric or other haptic output devices. Some devices can serve more than one input/output function. For example, the touch screen 722 and the display 734 can be combined into a single input/output device.

In an embodiment, the camera module 726 may include a digital camera capable of forming a digital image file from a captured image. In some implementations, the camera module 726 may include two or more cameras, for example, a front camera and a rear camera positioned on two sides of the mobile device 700 (e.g., in a mobile device). As such, the camera module 726 includes all hardware, such as a lens or other optical component(s), and software for creating a digital image file from a captured image. Alternatively, the camera module 726 may include the hardware needed to view an image, while a memory device of the mobile device 700 stores instructions for execution by the processor 702 in the form of software to create a digital image file from a captured image. In an example embodiment, the camera module 726 may further include a processing element such as a co-processor, which assists the processor 702 in processing image data and an encoder and/or decoder for compressing and/or decompressing image data. In an embodiment, the camera module 726 may provide live image data (or viewfinder image data) to the display 734.

A wireless modem 740 can be coupled to one or more antennas (not shown) and can support two-way communications between the processor 702 and external devices, as is well understood in the art. The wireless modem 740 is shown generically and can include, for example, a cellular modem 742 for communicating at long range with the mobile communication network, a Wi-Fi-compatible modem 744 for communicating at short range with an external BLUETOOTH®-equipped device or a local wireless data network or router, and/or a BLUETOOTH®-compatible modem 746. The wireless modem 740 is typically configured for communication with one or more cellular networks, such as a GSM network for data and voice communications within a single cellular network, between cellular networks, or between the mobile device and a public switched telephone network (PSTN).

The mobile device 700 can further include one or more input/output ports 750, a power supply 752, one or more sensors 754 for example, an accelerometer, a gyroscope, a compass, or an infrared proximity sensor for detecting the orientation or motion of the mobile device 700, a transceiver 756 (for wirelessly transmitting analog or digital signals) and/or a physical connector 760, which can be a USB port, IEEE 1394 (FireWire) port, and/or RS-232 port. The illustrated components are not required or all-inclusive, as any of the components shown can be deleted and other components can be added.

With the image processing applications and/or other software or hardware components, the mobile device 700 can implement the technologies described herein. For example, the processor 702 can facilitate capture of images or image frames of a scene through the camera module 726 and perform post-processing of the captured image frames.

Although the mobile device 700 is illustrated in FIG. 7 in the form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of a method comprises providing a user interface on a device for creating viewable content from a collection comprising at least one multimedia content;

causing the user interface, by a processor, to present an interactive display to a user;

presenting the collection on the interactive display;

receiving one or more gesture inputs from the user on the collection, wherein each gesture input indicates at least one of a desired effect to be performed and a region to be displayed on a viewport of the device; and creating a viewable content from the at least one multimedia content of the collection based on the one or more gesture inputs.

In one embodiment the method further comprises storing at least one of the one or more gesture inputs and the viewable content in a memory.

In one embodiment of the method, alternatively or additionally, storing the one or more gesture inputs comprises storing information associated with one or more traces of the one or more gesture inputs.

In one embodiment, alternatively or additionally, the method further comprises performing a playback of the viewable content based on the one or more gesture inputs stored in the memory.

In one embodiment of the method, alternatively or additionally, a speed of the playback of the viewable content is based on a speed of receipt of the one or more gesture inputs from the user on the collection.

In one embodiment, alternatively or additionally, the method further comprises editing the viewable content based on editing at least one gesture input of the one or more gesture inputs that are stored.

In one embodiment of the method, alternatively or additionally, the at least one multimedia content is at least one of a still image, a video clip, a living image and a three dimensional object.

In one embodiment of the method, alternatively or additionally, the one or more gesture inputs comprise at least one of a line, a spiral-in pattern, a spiral-out pattern, a closed loop encasing at least a region of a multimedia content of the at least one multimedia content.

In one embodiment of the method, alternatively or additionally, the desired effect includes at least one of a pan, zoom in, zoom out, transitions between multimedia contents of the collections.

In one embodiment of the method, alternatively or additionally, when a gesture input of the one or more gesture inputs comprise a spiral-in pattern on a region of a multimedia content, the desired effect performed in the viewable content comprises zooming in the region of the multimedia content during playback of the viewable content.

In one embodiment of the method, alternatively or additionally, when a gesture input the one or more gesture inputs comprises a spiral-out pattern on a region of a multimedia content, the desired effect performed in the viewable content comprises zooming out the region of the multimedia content during playback of the viewable content.

In one embodiment of the method, alternatively or additionally, when a gesture input of the one or more gesture inputs comprises a line on the at least one multimedia content, the desired effect performed in the viewable content includes panning the viewable content in a direction corresponding to the line during playback of the viewable content.

An embodiment of a device comprises
a user interface;
a memory comprising computer program code for image processing; and
a processor configured to execute the computer program code to cause the device to at least perform:
presenting an interactive display to a user on the user interface;
presenting a collection comprising at least one multimedia content on the interactive display;
receiving one or more gesture inputs from the user on the collection, wherein each gesture input indicates at least one of a desired effect to be performed and a region to be displayed on a viewport of the device; and
creating a viewable content from the at least one multimedia content of the collection based on the one or more gesture inputs.

In one embodiment the device is further caused, at least in part to store at least one of the one or more gesture inputs and the viewable content.

In one embodiment of the device, alternatively or additionally, to store the one or more gesture inputs the device is further caused, at least in part to store information associated with one or more traces of the one or more gesture inputs.

In one embodiment the device is, alternatively or additionally, further caused, at least in part to perform a playback of the viewable content based on the one or more gesture inputs stored in the memory.

In one embodiment of the device, alternatively or additionally, a speed of the playback of the viewable content is based on a speed of receipt of the one or more gesture inputs from the user on the collection.

In one embodiment the device is, alternatively or additionally, further caused, at least in part to edit the viewable content based on editing at least one gesture input of the one or more gesture inputs that are stored.

In one embodiment of the device, alternatively or additionally, the at least one multimedia content is at least one of a still image, a video clip, a living image and a three dimensional object.

An embodiment of a computer program product comprises at least one computer-readable storage medium, the computer-readable storage medium comprising a set of instructions, which, when executed by a processor, cause a device to at least perform:
providing a user interface on the device for creating viewable content from a collection comprising at least one multimedia content;
causing the user interface, by the processor, to present an interactive display to a user;
presenting the collection on the interactive display;
receiving one or more gesture inputs from the user on the collection, wherein each gesture input indicates at least one of a desired effect to be performed and a region to be displayed on a viewport of the device; and
creating a viewable content, by the processor, from the at least one multimedia content of the collection based on the one or more gesture inputs.

Various example embodiments offer, among other benefits, techniques for an interactive display for creating a viewable content. Various example embodiments provision for an efficient method of creating a viewable content from at least one multimedia content. The user can select a region of interest in the multimedia content for applying desired effects. Various example embodiments provision for receiving one or more gesture inputs on the multimedia content. The gesture inputs indicate the desired effects to be applied on the selected region in the multimedia content, thereby reducing complexity in preparing the viewable content as compared to standard techniques. The user requires only a user device, such as, the device 100 to create the viewable content. As the one or more gestures and the viewable content are stored in memory, the user can edit the viewable content by removing certain gestures pertaining to a desired effect in a selected region. The user can in turn apply new effects in the selected region by using hand gestures. Further, the complexity in preparing a viewable content is significantly reduced due to use of simple gestures to create the viewable content from at least one multimedia content. Moreover, creating the video content based on the gestures provided on the multimedia content provide significant time savings for the user.

Furthermore, various example embodiments may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices such as disks, thumb drives, memory etc. The software can be suitable for execution on a parallel processor or a serial processor such that the method operations may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The embodiments illustrated and described herein as well as embodiments not specifically described herein but within the scope of aspects of the disclosure constitute exemplary apparatus means for creating a viewable content. For example, the elements illustrated and described with reference to FIGS. 1 and 7, when configured, under control of the processor 102 and program code in the memory 104 to perform the operations illustrated and described with reference to FIGS. 1 to 7, constitute an exemplary image processing application means for providing a user interface on a device for creating viewable content from a collection comprising at least one multimedia content, for causing the user interface, by a processor, to present an interactive display to the user, for presenting the collection on the interactive display, for receiving one or more gestures by the user on the collection, wherein each gesture indicates at least one of a desired effect to be performed and a region to be displayed on a viewport of the device, for creating a viewable content based on the one or more gestures, and for storing at least one of the one or more gestures and the viewable content in a memory.

The embodiments illustrated and described herein as well as embodiments not specifically described herein but within the scope of aspects of the invention constitute exemplary apparatus means for creating a viewable content on an interactive display. For example, the elements illustrated and described with reference to FIGS. 1 and 7, when configured, under control of the processor 102 and program code in the memory 104 to perform the operations illustrated and described with reference to FIGS. 1 to 6, constitute an exemplary image processing application means for providing a user interface on a device for creating viewable content from a collection comprising at least one multimedia content, for causing the user interface, by a processor, to present an interactive display to a user, for presenting the collection on the interactive display, for receiving one or more gesture inputs from the user on the collection, wherein each gesture input indicates at least one of a desired effect to be performed and a region to be displayed on a viewport of the device and creating a viewable content from the at least one multimedia content of the collection based on the one or more gesture inputs.

The benefits and advantages described above may relate to one embodiment or may relate to several embodiments. The embodiments are not limited to those that solve any or all of the stated problems or those that have any or all of the stated benefits and advantages.

The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method, comprising:
providing a user interface on a device for creating viewable content from a collection comprising a plurality of multimedia content;
causing the user interface, by a processor, to present an interactive display to a user;
presenting the collection on the interactive display;
associating gesture inputs to be recognized with corresponding effects to be performed on the plurality of multimedia content, including recognizing at least a line, a spiral pattern, and a closed loop;
receiving gesture inputs from the user on the collection, wherein the gesture inputs indicate desired effects to be performed, as determined by the associating, and a region to be displayed on a viewport of the device, wherein the gesture inputs are received along a trace on the user interface that defines a sequence of the effects to be performed based on (i) the gesture inputs received on, between, and around each multimedia content of the plurality of multimedia content and (ii) movements to or from each multimedia content of the plurality of multimedia content; and
creating, from the plurality of multimedia content of the collection based on the gesture inputs and the trace, a viewable content including the desired effects that are to be displayed during playback of the viewable content, the desired effects applied (i) individually to the multimedia content, (ii) when switching between multimedia content, and (iii) collectively to the plurality of multimedia content in response to the inputs received on, between, and around the multimedia content as the closed loop, respectively, wherein the closed loop completely surrounds the plurality of media content and a same one of the desired effects is applied to all of the media content of the plurality of media content within the closed loop at a same time, the closed loop being a portion of the trace having a starting point and an ending point at a same location with the plurality of media content encircled within the closed loop.

2. The method of claim 1, further comprising storing at least one of the gesture inputs and the viewable content in a memory, wherein an initial user contact on the user interface defines a starting point for the playback of the viewable content and removing the user contact from the use interface defines an end point for the playback of the viewable content, the gesture inputs performed from the initial user contact to the removing of user contact along the trace defining the desired effects, the sequence of the desired effects, and a timing of the desired effects to be performed on the plurality of multimedia content to be displayed as the viewable content in the viewport, the plurality of multimedia content comprising multiple images or multiple video.

3. The method of claim 2, wherein storing the gesture inputs comprise storing information associated with one or more of the gesture inputs, and the trace is a single continuous user trace on the user interface.

4. The method of claim 2, further comprising performing a playback of the viewable content based on the gesture inputs stored in the memory, wherein a characteristic of the trace between multimedia content defines the desired effect when switching between the multimedia content during playback.

5. The method of claim 4, wherein a speed of the playback of the viewable content is based on a speed of receipt of the gesture inputs from the user on the collection.

6. The method of claim 2, further comprising editing the viewable content based on editing at least one gesture input of the gesture inputs that are stored.

7. The method of claim 1, wherein the plurality of multimedia content comprises at least one of a still image, a video clip, a living image and a three dimensional object, and wherein the gesture input received around the plurality of multimedia content defines a desired effect to the plurality of multimedia content within the viewport.

8. The method of claim 1, wherein the spiral pattern comprises at least one of a spiral-in pattern and a spiral-out pattern.

9. The method of claim 1, wherein the desired effect includes at least one of a pan, a zoom in, and a zoom out transition between multimedia contents of the collection.

10. The method of claim 8, wherein when a gesture input of the gesture inputs comprises the spiral-in pattern on a region of a multimedia content, the spiral-in pattern starting outside the region of the multimedia content and extending circularly inward to inside of the region of the multimedia content to cover the multimedia content, at least a plurality of spirals being within the region and on top of the multimedia content, the desired effect performed in the viewable content comprises zooming in the region of the multimedia content during playback of the viewable content.

11. The method of claim 8, wherein when a gesture input of the gesture inputs comprises the spiral-out pattern on a region of a multimedia content, the spiral-out pattern starting within the region of the multimedia content and extending circularly outward to outside of the region of the multimedia content to cover the multimedia content, at least a plurality of spirals being within the region and on top of the multimedia content, the desired effect performed in the viewable content comprises zooming out the region of the multimedia content during playback of the viewable content.

12. The method of claim 1, wherein when a gesture input comprises the line, the desired effect performed in the viewable content includes panning the viewable content in a direction corresponding to the line during playback of the viewable content.

13. A device, comprising:
a user interface;
a memory comprising computer program code for image processing;
and a processor configured to execute the computer program code to cause the device to at least perform:
presenting an interactive display to a user on the user interface;
presenting a collection comprising a plurality of multimedia content on the interactive display;
associating gesture inputs to be recognized with corresponding effects to be performed on the plurality of multimedia content, including recognizing at least a line, a spiral pattern, and a closed loop;
receiving gesture inputs from the user on the collection, wherein the gesture inputs indicate desired effects to be performed, as determined by the associating, and a region to be displayed on a viewport of the device, wherein the gesture inputs are received along a trace on the user interface that defines a sequence of the effects to be performed based on (i) the gesture inputs received on, between, and around each multimedia content of the plurality of multimedia content and (ii) movements to or from each multimedia content of the plurality of multimedia content; and
creating, from the plurality of multimedia content of the collection based on the gesture inputs and the trace, a viewable content including the desired effects that are to be displayed during playback of the viewable content, the desired effects applied (i) individually to the multimedia content, (ii) when switching between multimedia content, and (iii) collectively to the plurality of multimedia content in response to the inputs received on, between, and around the multimedia content, as the closed loop, respectively, wherein the closed loop completely surrounds the plurality of media content and a same one of the desired effects is applied to all of the media content of the plurality of media content within the closed loop at a same time, the closed loop being a portion of the trace having a starting point and an ending point at a same location with the plurality of media content encircled within the closed loop.

14. The device of claim 13, further caused, at least in part to store at least one of the gesture inputs and the viewable content.

15. The device of claim 14, wherein to store the gesture inputs the device is further caused, at least in part to store information associated with one or more of the gesture inputs.

16. The device of claim 14, further caused, at least in part to perform the playback of the viewable content based on the gesture inputs stored in the memory.

17. The device of claim 16, wherein a speed of the playback of the viewable content is based on a speed of receipt of the gesture inputs from the user on the collection.

18. The device of claim 14, further caused, at least in part to edit the viewable content based on editing at least one gesture input of the gesture inputs that are stored.

19. The device of claim 13, wherein the plurality of multimedia content comprises at least one of a still image, a video clip, a living image and a three dimensional object.

20. A computer program product comprising at least one computer-readable storage medium, the computer-readable storage medium comprising a set of instructions, which, when executed by a processor, cause a device to at least perform:

provuding a user interface on the device for creating viewable content from a collection comprising a plurality of multimedia content;

causing the user interface, by the processor, to present an interactive display to a user;

presenting the collection on the interactive display;

associating gesture inputs to be recognized with corresponding effects to be performed on the plurality of multimedia content, including recognizing at least a line, a spiral pattern, and a closed loop;

receiving gesture inputs from the user on the collection, wherein the gesture inputs indicate desired effects to be performed, as determined by the associating, and a region to be displayed on a viewport of the device, wherein the gesture inputs are received along a trace on the user interface that defines a sequence of the effects to be performed based on (i) the gesture inputs received on, between, and around each multimedia content of the plurality of multimedia content and (ii) movements to or from each multimedia content of the plurality of multimedia content; and creating, by the processor, from the plurality of multimedia content of the collection based on the gesture inputs and the trace, a viewable content including the desired effects that are to be displayed during playback of the viewable content, the desired effects applied (i) individually to the multimedia content, (ii) when switching between multimedia content, and (iii) collectively to the plurality of multimedia content in response to the inputs received on, between, and around the multimedia content, as the closed loop, respectively, wherein the closed loop completely surrounds the plurality of media content and a same one of the desired effects is applied to all of the media content of the plurality of media content within the closed loop at a same time, the closed loop being a portion of the trace having a starting point and an ending point at a same location with the plurality of media content encircled within the closed loop.

* * * * *